Jan. 2, 1968 | G. R. GIEDD | 3,361,865

COAXIAL MICRO PROBE

Filed Dec. 27, 1965

INVENTOR
GARY R. GIEDD

BY David L. Koffley

ATTORNEY

United States Patent Office 3,361,865

Patented Jan. 2, 1968

3,361,865
COAXIAL MICRO PROBE
Gary R. Giedd, Wappinger Falls, N.Y., assignor to International Business Machines Corporation, Armonk, N.Y., a corporation of New York
Filed Dec. 27, 1965, Ser. No. 516,465
7 Claims. (Cl. 174—9)

This invention relates to microminiature coaxial conductors, and more particularly to connective devices which make use of such coaxial conductors.

At present levels of logic circuit technology, signal propagation delays through such circuits lie in the nanosecond ($10^{-9}$) and subnanosecond ranges. These circuits operate upon pulse signal waveforms whose leading and lagging edges have rise times which are in the subnanosecond region and, as is well known, the component Fourier frequencies which comprise these pulses lie in the kilomegacycle range. At these frequencies, any conductor connected to such a circuit is quite likely to have a length which is an appreciable portion of a signal wavelength, and unless it is configured as a transmission line, reflections, cross talk, and standing waves are built up which degrade the pulse waveshapes.

In the past, the use of coaxial transmission lines to overcome the above-stated difficulties has proved no great problem due to the relative ease of connecting these lines to desired test points or connectors. However, with the advent of integrated circuitry to the data processing art, the sizes of the logic circuits have shrunk to minuscule proportions while their performance and signal processing requirements have increased. Thus, while the same or more sophisticated high frequency techniques must still be applied to these circuits, the equipment for embodying these techniques does not exist. For instance, a single 50 by 50 mil (.05") chip of silicon may be provided with 10–30 individual and discrete integrated circuits and require up to 24 or more peripherally spaced input-output terminals. Simple arithmetic will show that these terminals have a center-to-center spacing of approximately 8 mils and, when it is considered that each of these terminals is approximately 5 mils in diameter, only 5 mils separate individual terminals. When it is further realized that each of these terminals is an extremely thin layer of a malleable conductive metal, which metal may be readily deformed and a desired connection broken, if too much contact pressure is exerted, the difficulty of making contact to such devices is realized.

With the above difficulties in mind, the industry practice in producing these devices has been to fabricate the monolithic integrated circuits into the final package form to achieve larger contact areas before subjecting the integrated circuit to test. This has obviously added to the expense of producing such devices, since if the device is found to be faulty, the integrated circuit as well as the package is discarded. Nevertheless, the semiconductor industry has continued this costly procedure due to the fact that no known high frequency connector was available which would allow reliable contact to be made to the semiconductor integrated circuits.

Accordingly, it is an object of this invention to provide a coaxial conductor capable of use with microminiature circuits.

It is another object of this invention to provide a microminiature coaxial conductor of novel structure.

It is still another object of this invention to provide a microminiature coaxial conductor which retains extreme flexibility.

Yet another object of this invention is to provide microminiature coaxial conductors which are adapted to be employed in extremely close proximity to one another.

A further object of this invention is to provide a contacter which makes use of high frequency techniques and is adapted to connect to multiple contact integrated circuit devices.

In accordance with the above-stated objects, a flexible coaxial conductor is configured by immersing an insulated conductive wire in a liquid conductor. By then connecting the liquid conductor to a source of reference potential, the insulated conductive wire is provided with an outer conductive shield in the nature of a coaxial cable. This structure is utilized to provide a high frequency integrated circuit probe by passing the insulated conductive wires through the interior of a probe body which is filled with conductive liquid. In the interior of the body, the conductors are bent and pass out of the body through clearance holes which allow the conductors to slide therein but which prevent the conductive liquid from escaping. When connection is made to an integrated circuit by the conductive wires, the desired resiliency is provided while simultaneously retaining the high frequency characteristics of the probe.

The foregoing and other objects, features and advantages of the invention will be apparent from the following more particular description of the preferred embodiment of the invention, as illustrated in the accompanying drawings.

Figures 1, 2:
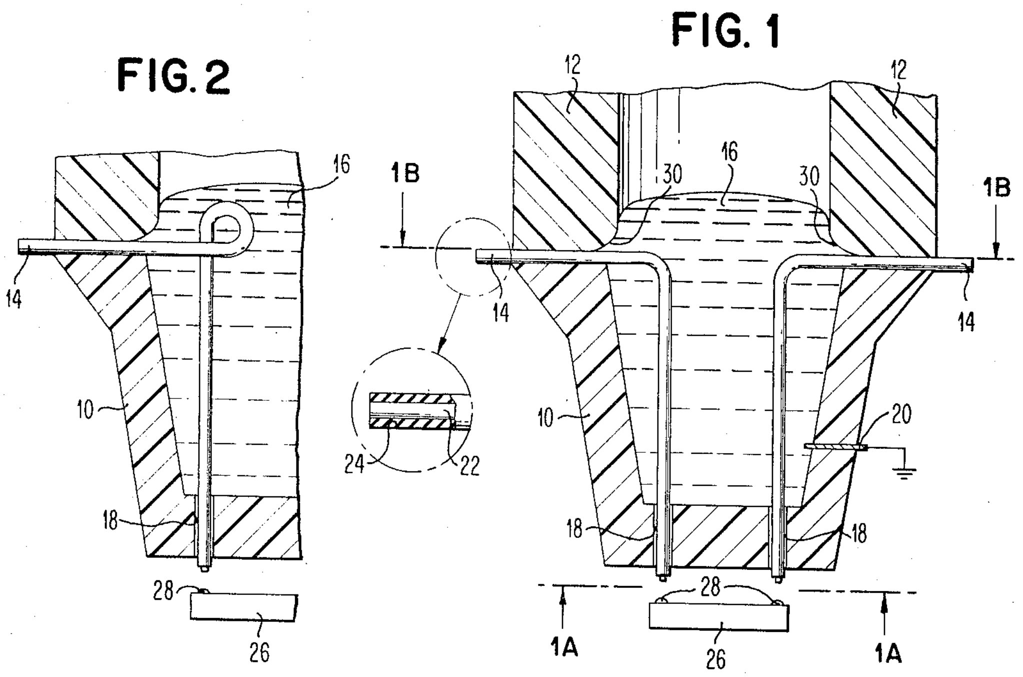
FIG. 1 is a sectional view of a microprobe embodying the invention.
FIG. 2 shows an alternative embodiment of the probe.

Referring now to FIG. 1, the microprobe is enclosed by a two part housing, lower section 10 and upper section 12. These housings may be composed of a suitable plastic or some other nonconductive material, e.g. polystyrene. A plurality of insulated conductors 14 extend through the probe housing and into a conductive liquid 16. Each of conductors 14 is bent to a 90° angle to align its lower portion with holes 18 in lower section 10 of the probe. A grounded conductor 20 extends through the wall of probe section 10 and into conductive liquid 16. The application of the ground potential to liquid 16 provides a grounded equal-potential surface which surrounds all of probe conductors 14 and provides them with the desired external coaxial shield required for high frequency test operations. In lieu of separate conductor 20, one of conductors 14 may be stripped of its insulation and provide the necessary connection between ground and conductive liquid 16.

Each of conductor wires 14 is preferable comprised of an inner core of a spring tempered resilient metal 22 such as beryllium copper or phosphor bronze. The exterior insulating coating 24 may be any plastic or varnish material which is impervious to conductive liquid 16. Conductive liquid 16 may be any of a number of electrical conductors which are liquid at the ambient temperature, e.g. mercury, gallium, alloys, etc.

An integrated circuit to which the microprobe must make electrical contact is shown schematically at 26 and is provided with a plurality of terminals 28. Terminals 28 (only two of which are shown) are extremely closely spaced and susceptible to damage should an excessive contact pressure be applied. Notwithstanding tight manufacturing controls, the upper surfaces of contacts 28 do not fall into a single plane but rather, into a plurality of levels. Therefore, to make electrical connection to such contacts with a nonyielding probe would cause excessive pressures and thus damage to certain of contacts 28. By using resilient probe connections, the contact pressures can be accurately controlled and damage avoided. To assure required resiliency, conductor wires 14 must be sufficiently flexible to flex upwardly until all wire tips connect to contacts 28. This action must occur without an over-pressure being applied to any one contact. Upper section 12 of the microprobe is thus provided with chamfered edges 30 which allow the horizontal arm of a conductor 14 to flex upwardly when its lower portion connects to a contact 28. To further reduce the amount of force required to provide good electrical contact between a conductive wire 14 and contact 28, the tip of each wire 14 may be coated with a layer of gold (not shown) which, due to its softness and freedom from contaminants, further reduces the pressure required to assure the desired low resistance connection.

Figure 1A:
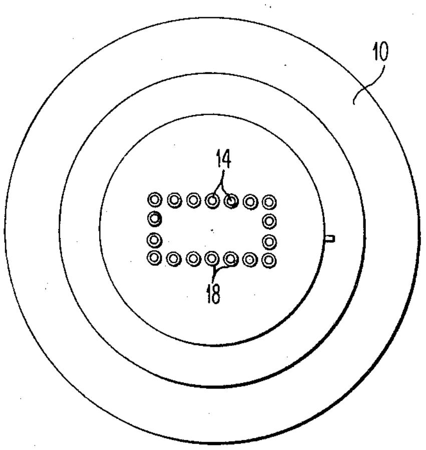
FIG. 1A is a view of the probe of FIG. 1 taken along line 1A—1A.
Figure 1B:
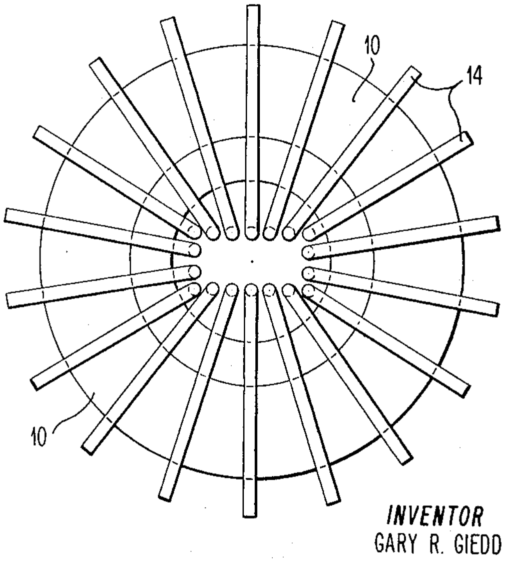
FIG. 1B is a view of the probe of FIG. 1 taken along line 1B—1B.

Assuming that integrated circuit 26 is an 18 terminal device, the underside of the microprobe will appear as shown in FIG. 1A. FIG. 1B shows the orientation of conductors 14 in relation to lower section 10 of the microprobe. In actual size, the width of integrated circuit 28 in FIG. 1 approrimates .05 inch and the diameter of each of wires 14 is approximatey .005 inch. The diameter of holes 18 is approximately .0052 inch to thereby allow conductors 14 to slide therein while retaining conductive liquid 16 within the probe. In one test configuration, the probe of FIG. 1 will fit within a hole drilled in a printed circuit board and each of the upper portions of conductors 14 will connect to strip line coaxial conductors preprinted on the circuit board. The entire assembly will be positioned over integrated circuit 26 and lowered thereupon to provide the desired connections to contacts 28. Upon being lowered, each of conductors 14 will flex upwardly until all are in connection with contacts 28. Irrespective of the amount of flexure in any of conductors 14 however, conductive liquid 16 will maintain the shielding between them. It has been determined that with this construction, a force of only 2–5 grams/conductor is required to allow all of conductors 14 to reliably connect to contacts 28.

Under certain circumstances, the spring constant of wires 14 may be such that the force required to cause them to bend is sufficiently high to damage contacts 28. Under these conditions, the wire configuration shown in FIG. 2 may be used. Each wire 14 is bent as shown in the interior of the microprobe to reduce the amount of force required to cause upward flexure thereof. In either case (that of FIG. 1 or FIG. 2) it is absolutely necessary to immerse all of conductor 14 within conductive liquid 16.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A flexible coaxial conductor comprising:
an insulated conductor;
a liquid conductor surrounding said insulation; and
means for connecting said liquid conductor to a reference potential.

2. The invention as defined in claim 1 wherein said liquid is a conductor which retains its liquid state at the ambient temperature.

3. The invention as defined in claim 2 wherein said liquid conductor is a metal.

4. In a connector, the combination comprising:
nonconductive housing means provided with a plurality of apertures;
liquid conductive means contained within said housing means;
a plurality of insulated conductors immersed in said liquid conductive means within said housing means and positioned to extend through said apertures; and
means for applying a reference potential to said liquid conductive means.

5. The invention as defined in claim 4 wherein said apertures are proportioned to allow relative movement between said housing means and said conductors without allowing the escape of said liquid conductive means.

6. The invention as defined in claim 5 wherein each said insulated conductor is comprised of an insulation coated resilient metal wire which is bent within said housing means to allow flexure therein.

7. The invention as defined in claim 6 wherein said liquid conductive means is a metal which exists in the liquid state at the ambient temperature.

No references cited.

LEWIS H. MYERS, *Primary Examiner.*

A. T. GRIMLEY, *Assistant Examiner.*